(12) United States Patent
Chang

(10) Patent No.: US 6,782,970 B2
(45) Date of Patent: Aug. 31, 2004

(54) ACOUSTIC SOURCE USING A SHAFTLESS ELECTRICAL HAMMER

(75) Inventor: Chung Chang, Wilton, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 103 days.

(21) Appl. No.: 10/138,274

(22) Filed: Apr. 25, 2002

(65) Prior Publication Data

US 2003/0205428 A1 Nov. 6, 2003

(51) Int. Cl.$^7$ .............................. G01V 1/00; G01V 1/40
(52) U.S. Cl. ..................... 181/101; 181/105; 181/108; 367/86; 175/1
(58) Field of Search ................................ 181/101, 105, 181/106, 108, 113, 122; 367/86, 37, 911, 182, 185, 140; 175/1; 166/249

(56) References Cited

U.S. PATENT DOCUMENTS

| | | | | |
|---|---|---|---|---|
| 4,383,591 A | * | 5/1983 | Ogura ........................ 181/106 |
| 4,715,470 A | | 12/1987 | Paulsson ..................... 181/106 |
| 4,862,991 A | * | 9/1989 | Hoyle et al. ................. 181/106 |
| 5,036,945 A | | 8/1991 | Hoyle et al. ................. 181/104 |
| 5,265,067 A | | 11/1993 | Chang ......................... 367/31 |
| 5,309,404 A | | 5/1994 | Kostek et al. ................ 367/31 |
| 5,387,767 A | | 2/1995 | Aron et al. ................... 367/25 |
| 5,432,305 A | * | 7/1995 | Nelson ........................ 181/101 |
| 5,691,809 A | | 11/1997 | Tackett et al. ................ 356/72 |
| 5,753,812 A | | 5/1998 | Aron et al. .............. 73/152.47 |
| 5,763,812 A | * | 6/1998 | Collins ......................... 124/3 |
| 5,838,633 A | | 11/1998 | Sinha .......................... 367/31 |
| 6,002,643 A | * | 12/1999 | Tchakarov et al. .......... 181/102 |
| 6,145,615 A | | 11/2000 | Beresford et al. ........... 181/102 |
| 6,188,961 B1 | | 2/2001 | Mandal .......................... 702/6 |
| 6,213,250 B1 | | 4/2001 | Wisniewski et al. ........ 181/104 |
| 6,595,285 B2 | * | 7/2003 | Dubois et al. ............... 181/106 |

FOREIGN PATENT DOCUMENTS

| | | | | |
|---|---|---|---|---|
| EP | 0 461 321 A1 | 12/1991 | .......... G01N/21/47 |
| EP | 1 203 942 A1 | 5/2002 | .......... G01N/21/35 |
| WO | WO 01/20322 A1 | 3/2001 | .......... G01N/33/28 |

OTHER PUBLICATIONS

Http://www.oz.net/~coilgun/home.htm—Barry Hansen (publisher), copyright 1998, pp. 1–120.*
Http://www.oz.net/~coilgun/photos.htm.*
Http://www.oz.net/~coilgun/theory/solenoidphysics.htm□□"MacMillan Encyclopedia of Physics", p. 1459, John S. Rigned, copyright 1996.*
Http://web2airmail.net/jd4usa/guncoil5.htm.*
Article: "Development of a suspension PS logging systems seismic source for hard ground", Publisher: Geophysics, (1987) vol. 52, No. 3, pp. 381. Autors: Tanaka, K; Inoue, S; Ogura, K; OYO Corp, Urawa, Japan.*
Chang, C. et al. "Determine Transverse Impact Force on a Composite Laminate by Signal Deconvolution", *Experimental Mechanics*, pp. 414–419 (Dec., 1989).
Chang, C. et al. "Frequency Division Method for AE Source Characterization", *Journal. Acoust. Soc. Am.*, vol. 79, No. 5, pp 1307–1316 (May 1986).

(List continued on next page.)

*Primary Examiner*—David Martin
*Assistant Examiner*—Eduardo Colon Santana
(74) *Attorney, Agent, or Firm*—Jody Lynn DeStefanis; William B. Batzer; John J. Ryberg

(57) ABSTRACT

A shaftless acoustic source is disclosed having a solenoid, a bullet and driving electronics. The bullet, which is positioned inside the solenoid's coil, can be accelerated by a magnetic force generated when a current pulse is applied to the coil. Acoustic energies are generated upon the impact of the bullet with an object, such as a borehole wall. This impact force can be described by the Hertzian Contact Theory (also referred to herein as Hertzian Theory) as a point of normal force with a time function similar to a half period sine function. A retraction device may be used to retract the bullet back into the solenoid after firing.

10 Claims, 16 Drawing Sheets-

OTHER PUBLICATIONS

Hestenes, M. R. "The Conjugate–Gradient Method for Solving Linear Systems". *Proceeding of Symposia in Applied Mathematics*, vol. VI–Numerical Analysis, pp. 83–102 (1956).

Hsu, N. N. et al. "Experiments in Acoustic Emission Waveform Analysis for Characterization of AE Sources, Sensors and Structures". *ASME*, AMD–29, pp. 85–106 (1978).

Hunter, S. C. "Energy Absorbed by Elastic Waves During Impact". *Journal of the Mechanics and Physics of Solids*, vol. 5, pp. 162–171 (1957).

Lee, M. W. et al. "Theoretical Seismic Wave Radiation from a Fluid–Filled Borehole". *Geophysics*, vol. 47, No. 9, pp. 1308–1314 (Sep. 1982).

Lee, M. W. "Low–Frequency Radiation from Point Sources in a Fluid–Filled Borehole". *Geophysics*, vol. 52, No. 9, , pp. 1801–1807 (Sep. 1986).

Love, A. E. H. "A Treatise on the Mathematical Theory of Elasticity". C.U.P., 4th Edition, pp. 198.

Michaels, J. E. et al. "Applications of Deconvolution to Acoustic Emission Signal Analysis". *Materials Evaluation*, vol. 39, No. 11, pp. 1032–1036 (1981).

Wang, R. J. et al. "The Determination of Digital Wiener Filters by Means of Gradient Methods". *Geophysics*, vol. 38, No. 2, pp. 310–326 (Apr. 1973).

Http://web2.airmail.net/jd4usa/guncoil5.htm.

* cited by examiner-

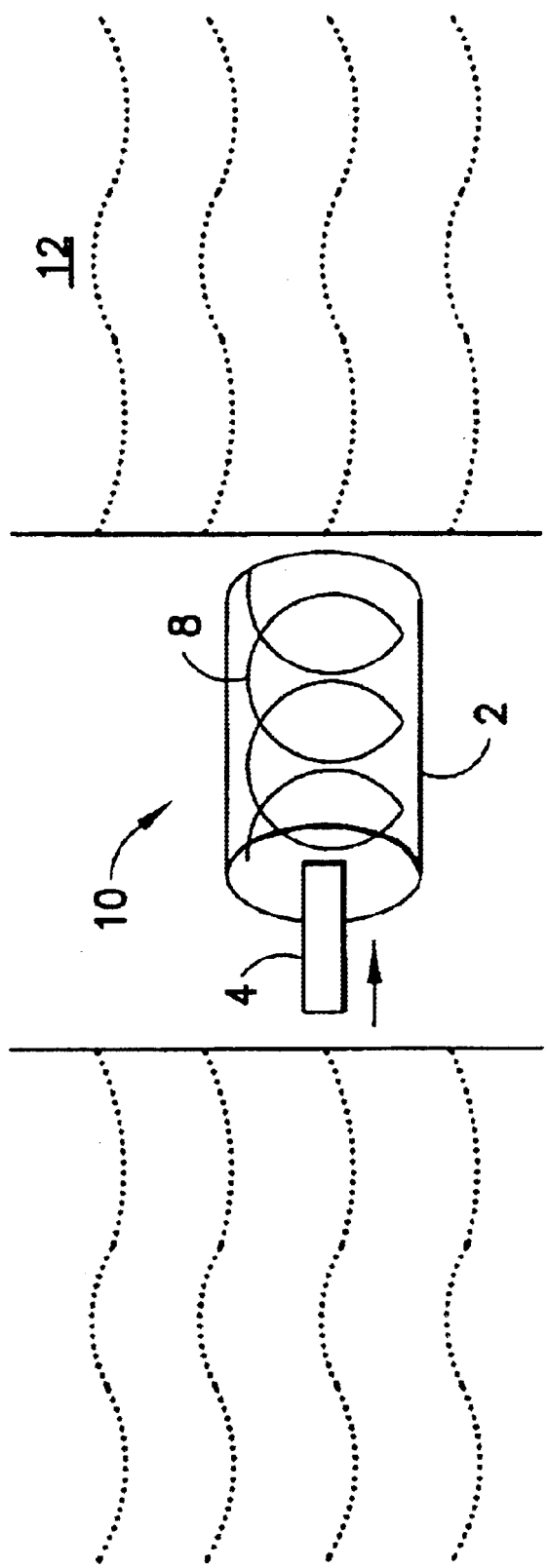

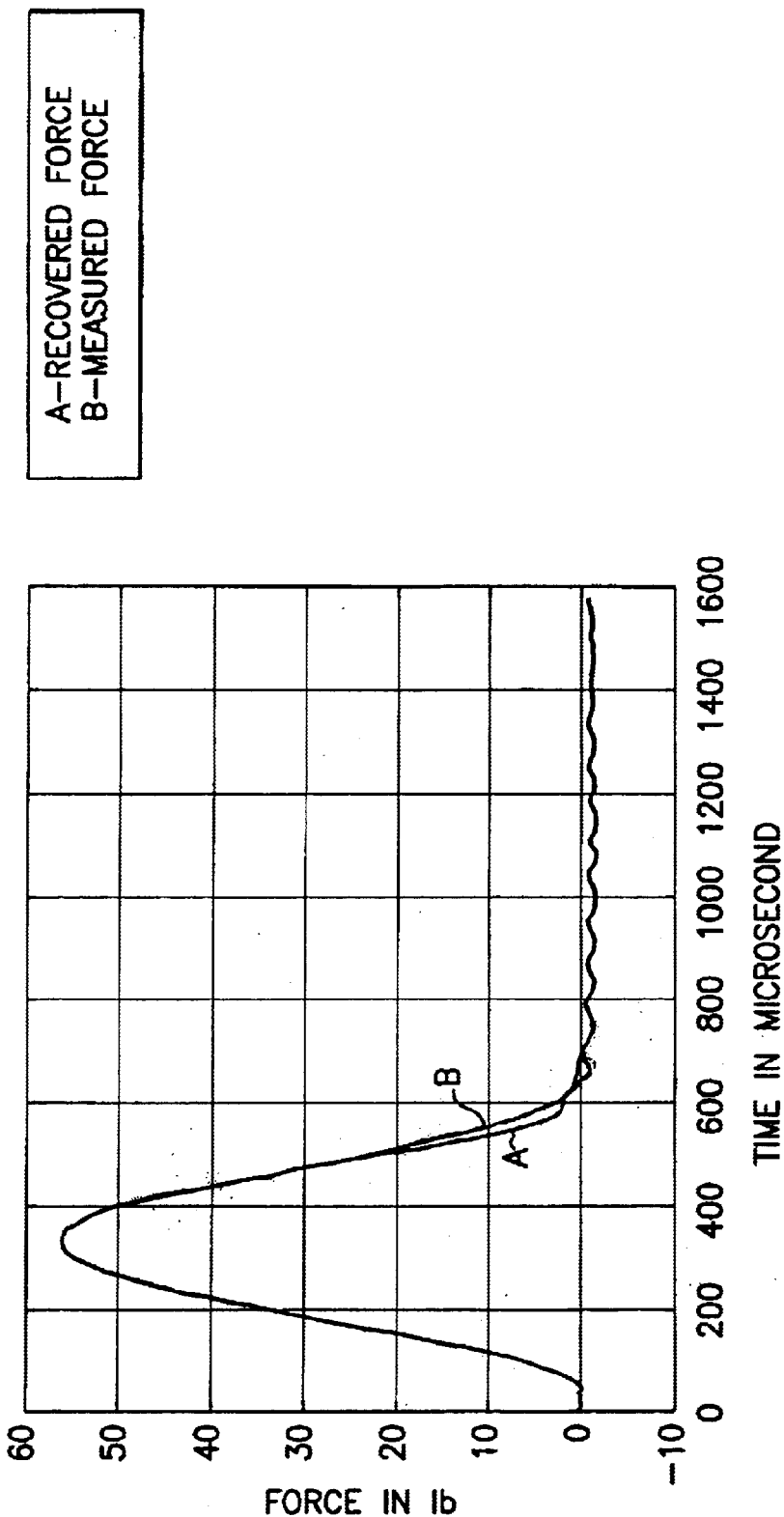

NO SHIELD

OUTER SHIELD ONLY

ONE END CAP

COMPLETE SHIELD

ACOUSTIC SOURCE USING A SHAFTLESS ELECTRICAL HAMMER

FIELD OF THE INVENTION

The present invention relates to a method and apparatus to provide an acoustic source, and more particularly to a shaftless acoustic source suitable for sensing mechanical properties of a formation.

BACKGROUND

An effective acoustic source is a key component for any sonic imaging tool, particularly for deep acoustic imaging surveys. To function effectively during deep image surveys, the acoustic source should radiate a wideband pulse efficiently so as to generate compact time domain signatures. These pulses ideally should have energetic low frequency components to propagate significant distances into the formation. At the same time, these pulses should generate a minimum of Stoneley and tool modes.

Traditionally, enhancement of the low frequency range of the spectrum has been problematic for two reasons. First, borehole dimensions limit the possibility of building low frequency resonators to enhance this range of the spectrum. Second, low frequency sources tend to excite the less preferred Stoneley mode. This latter effect is especially true for traditional fluid coupled monopole sources where the impedance mismatch between borehole fluid and the formation allows only a small percentage of the energy to be radiated. Most of the energy propagates within the borehole as the less preferred Stoneley mode. As a result of these effects, previous attempts to build compact, simple and efficient low frequency borehole sources have been only marginally successful.

Because it is difficult to isolate the energy source from the body of the tool, many traditional source designs have the additional tendency to generate tool borne arrivals in the same frequency band as the signal. Accordingly, the ability to generate tool arrivals that are much smaller in relative magnitude and in a different frequency band from the signal is a desirable characteristic of any new source design.

There are numerous methods and apparatuses that have been used to isolate the energy source from the body of the tool or to attenuate desired frequencies. These designs have not been entirely successful in addressing the issues discussed above. For example, commonly owned U.S. Pat. No. 5,387,767, entitled "Transmitter for Sonic Logging-While-Drilling" to Aron et al., discloses a piezoelectric source that is isolated from a drilling collar using various springs. Likewise, commonly owned U.S. Pat. No. 5,753,812, entitled "Transducer for Sonic Logging" to Aron et al., discloses an isolated piezo-electric ceramic transmitter mounted within an elastomer body seated in a groove of a drilling collar. In addition, U.S. Pat. No. 6,188,961, entitled "Acoustic Logging Apparatus and Method" to Mandal, discloses a single dipole source and multiple receiver apparatus that uses an isolator to prevent unwanted signals. Further, U.S. Pat. No. 6,213,250, entitled "Transducer for Acoustic Logging" to Wisniewski et al., discloses a transducer housing that is removed from the axis of a tool body.

Several apparatuses and methods have been developed to dampen unwanted signals. For example, commonly owned U.S. Pat. No. 5,309,404, entitled "Receiver Apparatus for Use in Logging-While-Drilling" to Kostek et al., discloses a receiver/transmitter configuration designed to reduce the affect of unwanted modes. Likewise, U.S. Pat. No. 6,145,615, entitled "Mechanic Filter" to Beresford et al., discloses a drill string design that enables acoustic isolation between a drill bit and the drill string. The drill string includes a section with a spring and a mass that acts to dampen longitudinal compression waves.

The above-referenced patents are incorporated by reference herein in their entirety.

Accordingly, there exists a need for an apparatus and a method to generate efficient low frequency, high energy pulses that propagate significant distances into a formation while minimizing the generation of Stoneley and tool modes.

It is an object of the present invention to provide an apparatus and a method for the generation of acoustic signals useful in deep imaging applications and overcoming the limitations of the prior art. More specifically, it is an object of the present invention to provide a shaftless apparatus that is simple and compact yet generates a radiated signal sufficient for deep acoustic image surveys. It is yet another object of the present invention to provide an acoustic source that produces a reaction force on the body of a drilling tool that is both weaker in relative magnitude and lower in frequency than the signal.

SUMMARY OF THE INVENTION

Many traditional acoustic energy sources are based on a hammer design in which the hammer's head strikes a blow creating the energy source. The hammer's shaft controls the motion of the blow and transmits the striking force to the head. Part of the kinetic energy from each blow of the hammer converts to acoustic energy during impact. However, in a borehole environment the shaft is an undesirable element because it allows significant acoustic energy leakage into borehole fluid as it reverberates after each impact. As disclosed herein, gun coil configurations (generally referred to herein as an acoustic source) are an exceptional alternative to shaft-based sources and overcome many of the limitations of the prior art.

A first embodiment of the present invention includes a shaftless acoustic source having a solenoid, a bullet and driving electronics. The bullet, which is positioned inside the solenoid's coil, can be accelerated by a magnetic force generated when a current pulse is applied to the coil. Acoustic energies are generated upon the impact of the bullet with an object (i.e. the deceleration of the bullet upon impact). While the bullet may directly impact a borehole formation, direct contact is not necessary. The bullet may impact a relatively acoustically transparent media and thereby impart acoustic energy into the borehole formation. This impact force can be described by the Hertzian Contact Theory (also referred to herein as Hertzian Theory) as a point of normal force with a time function similar to a half period sine function. A retraction means may be used to retract the bullet back into the solenoid after firing.

A second embodiment teaches a method of generating an acoustic source by propelling a bullet toward said borehole wall using an electromagnetic force. The electromagnetic force is generated by providing a solenoid having a bullet positioned within its coil. A current pulse is applied to the solenoid, accelerating the bullet to impact the borehole wall.

The acoustic source may be adapted for connection to a borehole apparatus (such as a host tool, including a sonde or drill collar for logging while drilling applications, or a permanent installation). The acoustic energy generated upon impact may be used to log a borehole formation by using receivers strategically positioned within the borehole (such as on the borehole apparatus).

Depending on the size of the bullet and the different cap materials, a peak force of 3000 to 4500 pounds with contact times from 100 to 300 microseconds can be generated using the present invention. Further, acceleration improvements up to four times can be achieved by positioning a magnetic shield around the coil of the solenoid thereby enhancing the magnetic driving force.

Note that the use of the term "bullet" merely refers to a mass used for impact and is not intended to limit this element to any particular shape or construction.

Further features and applications of the present invention will become more readily apparent from the figures and detailed description that follows.

BRIEF DESCRIPTION OF THE DRAWINGS

FIG. 1 is a schematic showing the acoustic source.

FIG. 2d is a graphical comparison of the recovered force and the measured force.

DETAILED DESCRIPTION

Figure 2A:
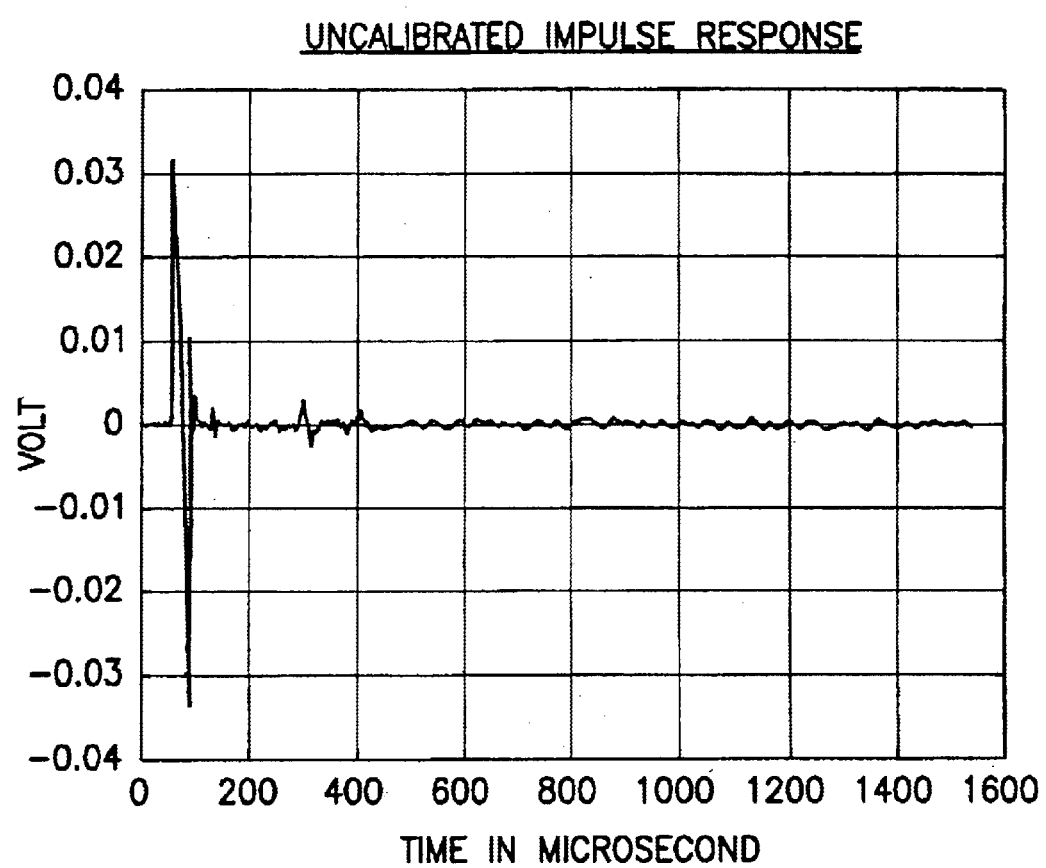
FIG. 2a is a graphical representation of an uncalibrated impulse response due to the impact of a small steel ball.

As shown in FIG. 1, the present invention discloses an acoustic source 10 having a solenoid 2, a bullet 4 and driving electronics (not shown). The bullet 4 is positioned within a coil 8 of the solenoid 2. While inside the coil 8, the bullet 4 can be accelerated by the magnetic force generated by applying a current pulse to the coil 8. Acoustic energies are generated upon the impact of the bullet 4 with the formation, in this case, a borehole wall 12. Alternatively, the bullet may impact a relatively acoustically transparent media positioned between the borehole and the bullet. The resultant impact force can be described by the Hertzian Theory as a point of normal force with a time function similar to a half period sine function.

The amplitude and the frequency band of the source 10 can be controlled (and suitably adjusted) based on the stiffness of the bullet 4, the Poisson constant of the formation 12 and the bullet 4, the curvatures of contact of the bullet 4 and the formation 12, the mass of the bullet 4 and the approaching speed of the bullet 4 toward the formation 12. If a media is positioned between the formation 12 and the bullet 4, the physical properties of this media should also be considered.

The magnetic field inside the solenoid 2 is close to uniform, implying that the force on a bullet 4 (such as one comprised of steel or iron) changes sign at the center of the coil 8 causing the bullet 4 to decelerate at either end of the solenoid 2. Therefore, to optimize the final velocity of the bullet 4, it is preferred that the driving current be turned off as the bullet 4 passes through the approximate center of the coil 8.

Under Hertzian Theory, the strength of the acoustic source of the present invention is based on the magnitude of the impact force which, in turn, is a function of the impact velocity, the mass of the bullet 4 and the deceleration the bullet 4 experiences on impact (i.e., the contact time). The bandwidth of acoustic radiation generated upon impact is determined by the contact duration of the impact. Both magnitude and contact time can be predicted by the Hertzian Theory as modeled between two solids. Between a solid object and a solid half space, the following equations predict the peak force:

$$f = -\frac{4}{3q} R^{\frac{1}{2}} Z_0^{\frac{3}{2}} \quad (1)$$

and contact time $$T = K V_0^{-\frac{1}{5}} \quad (2)$$

where $Z_0$, q and K are defined as $$Z_0 = \left\{ \frac{15}{16} mq \right\}^{\frac{2}{5}} R^{-\frac{1}{5}} V_0^{\frac{4}{5}} \quad (3)$$

$$q = \left\{ \frac{1-v^2}{E} + \frac{1-v_b^2}{E_b} \right\} \quad (4)$$

$$K = 2.94 \left( \frac{15}{16} mq \right)^{\frac{2}{5}} R^{-\frac{1}{5}} \quad (5)$$

where m is the mass of the bullet 4; R is the curvature of the contact; $V_0$ is the approaching speed of the bullet 4; and, v and E are the Poisson ratio and the stiffness of the solid, respectively. The subscript b denotes material constants associated with the bullet 4. The shape of the force-time function follows a half period sine function with the contact time as its period.

Time and magnitude history of the impact forces were obtained using a signal processing technique to deconvolve an impulse response from other impact receiver responses.

FIGS. 2a through 9 show results obtained from an experimental set-up having an electromagnetic hammer source (i.e., the acoustical source) positioned outside of a simulated formation, in this case an 8-cubic foot marble block. A surface strain sensor bonded a few inches away from the impact position was used to detect surface waves generated by the impact. The approaching speed of the bullet was measured using a laser diode with an optical detector.

An impulse force was generated by firing a bullet, in this case a ⅛-inch diameter steel ball, against the surface of the marble block. A very small ball was used to ensure that the force was essentially impulse like (i.e., had a negligible duration). FIG. 2a shows the response of the surface sensor to this impulsive force.

Figure 2B:
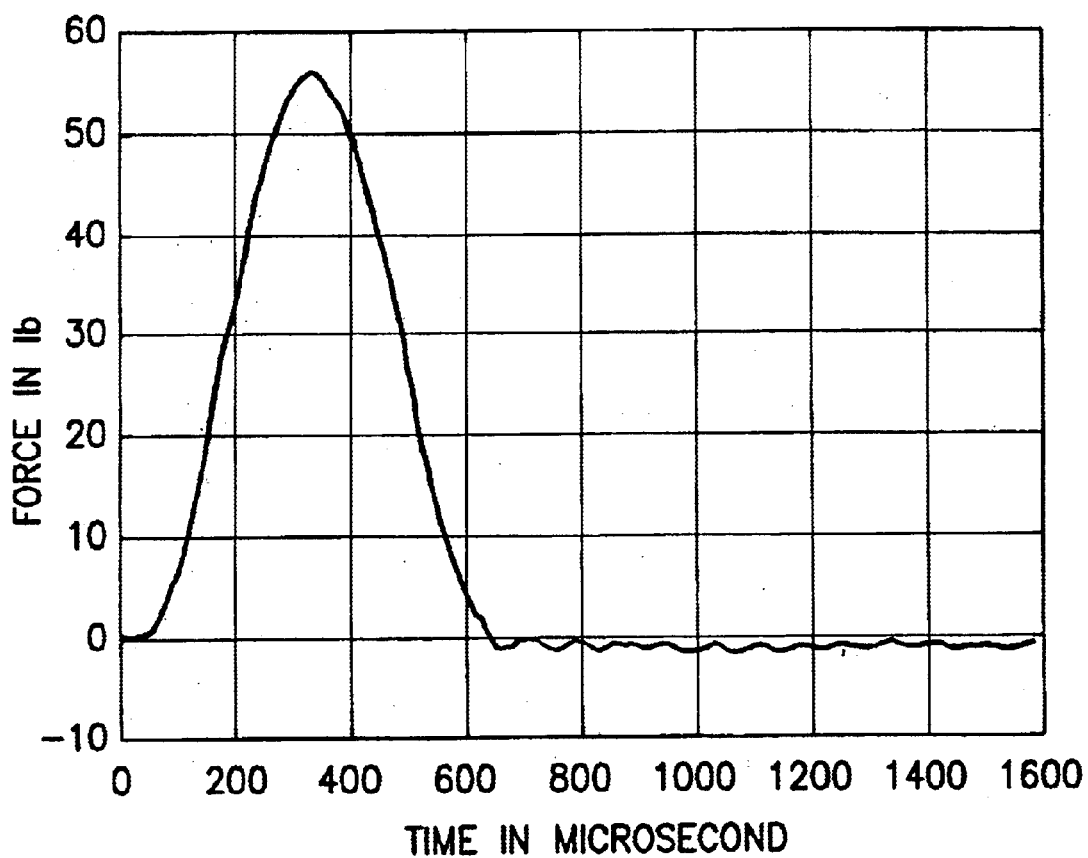
FIG. 2b is a graphical representation of measured PCB hammer impact force.
Figure 2C:
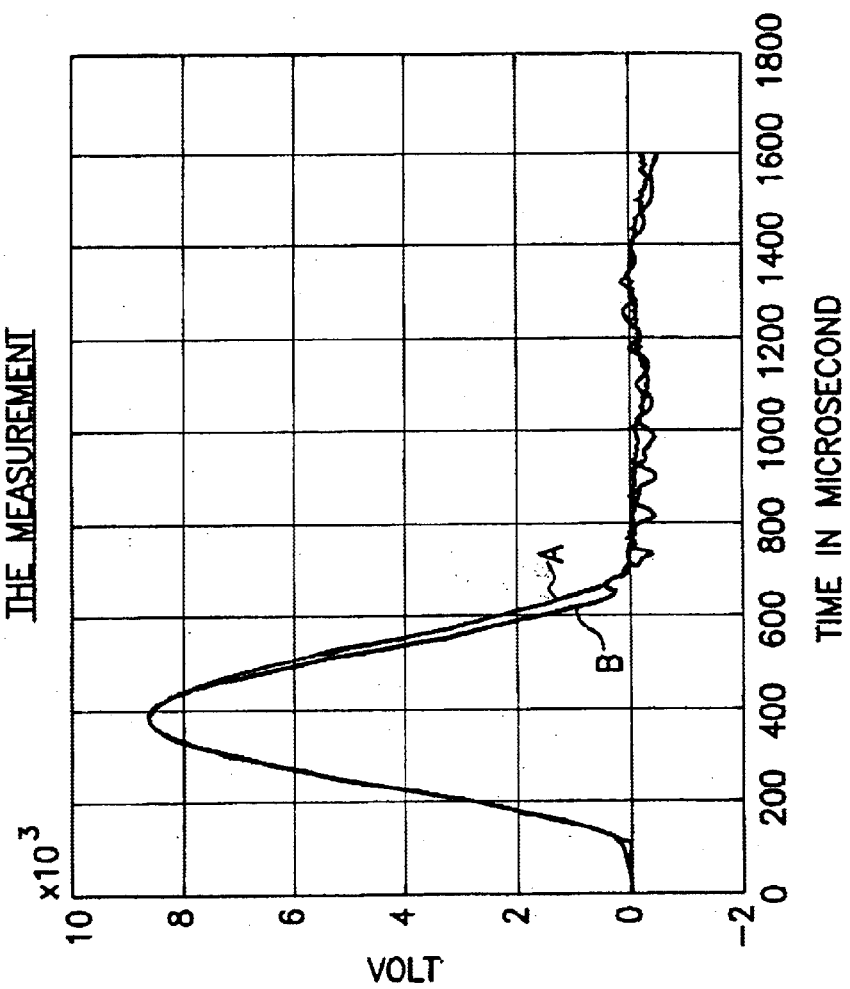
FIG. 2c is a graphical comparison of strain responses of the predicted signal and the measured signal.
Figure 3A:
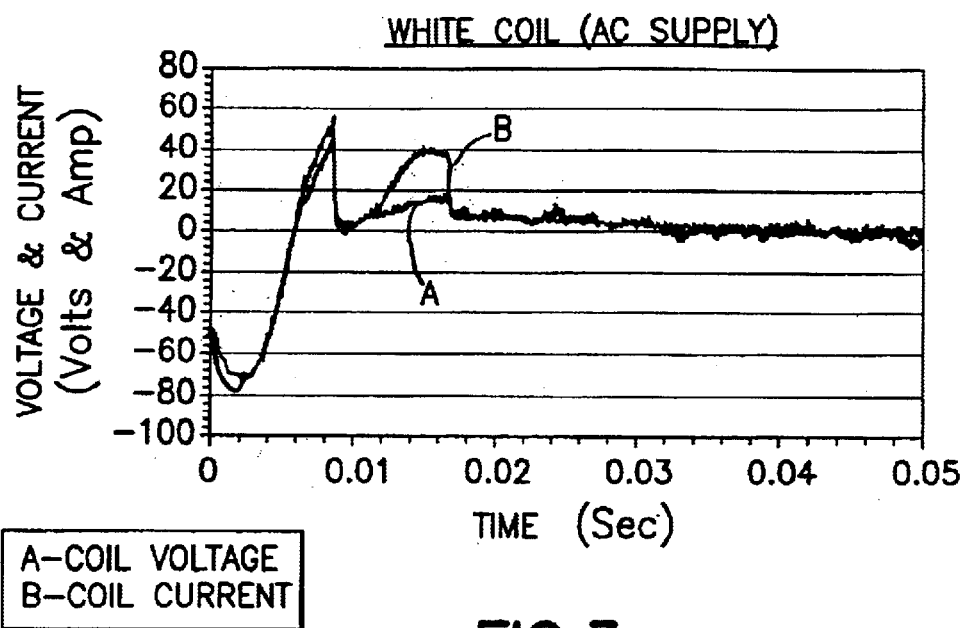
FIG. 3a is a graphical representation of the measured voltage and current during a typical firing.
Figure 3B:
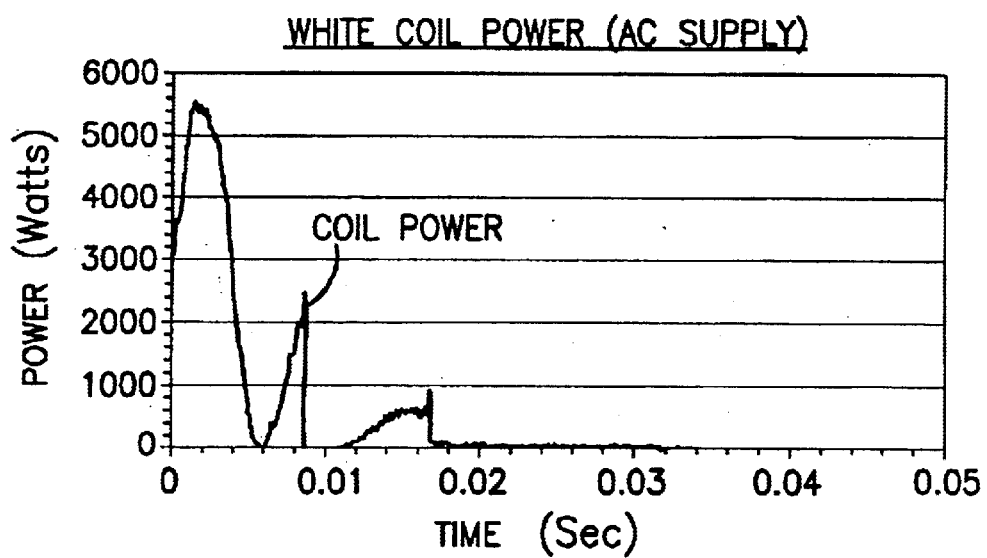
FIG. 3b is a graphical representation of the power consumption during a typical firing.

For calibration purposes, a piezoelectric hammer, such as that manufactured by PCB Piezotronics, Inc. of Depew, N.Y. (hereinafter referred to as a PCB hammer), containing a containing a force sensor in its head delivered a known force to the block at the same location as the ball's impact. FIG. 2b shows force measured by the PCB hammer. Convolving the impulse response shown in FIG. 2a with the measured force in FIG. 2b yields a prediction of the response of the surface strain sensor to the PCB hammer blow. FIG. 2c shows the response B of the surface strain sensor and the predicted response A after the peak amplitudes have been matched (i.e., the impulse amplitude calibrated). FIG. 2d shows the measured force B exerted by the PCB hammer and the predicted force A obtained by deconvolving Green's function from the surface strain sensor response. Based on these results, the recovered force A had a better DC response than that of the direct PCB measurement, which was subject to a high pass filter preventing its quick return to zero.

While any suitably strong material may be used, the bullet 4 is preferably made of a high permeability alloy having suitable magnetic, strength, and toughness characteristics. Cap materials may also be placed on all or part of the bullet 4 to enhance the results. The choice of cap materials will depend on the mechanical durability as well as the stiffness to control the contact time. Ideal cap materials may include plastic, rubber or metal.

FIGS. 5a and 5b show the measured voltage A and current B passing through the coil and the power consumed during a typical firing of a sample 3-inch long, 0.75-inch diameter, 167-gram bullet with a PVC head. Note that the power consumption for this configuration is less than that needed to drive a conventional wireline sonic monopole source.

Figure 4A:
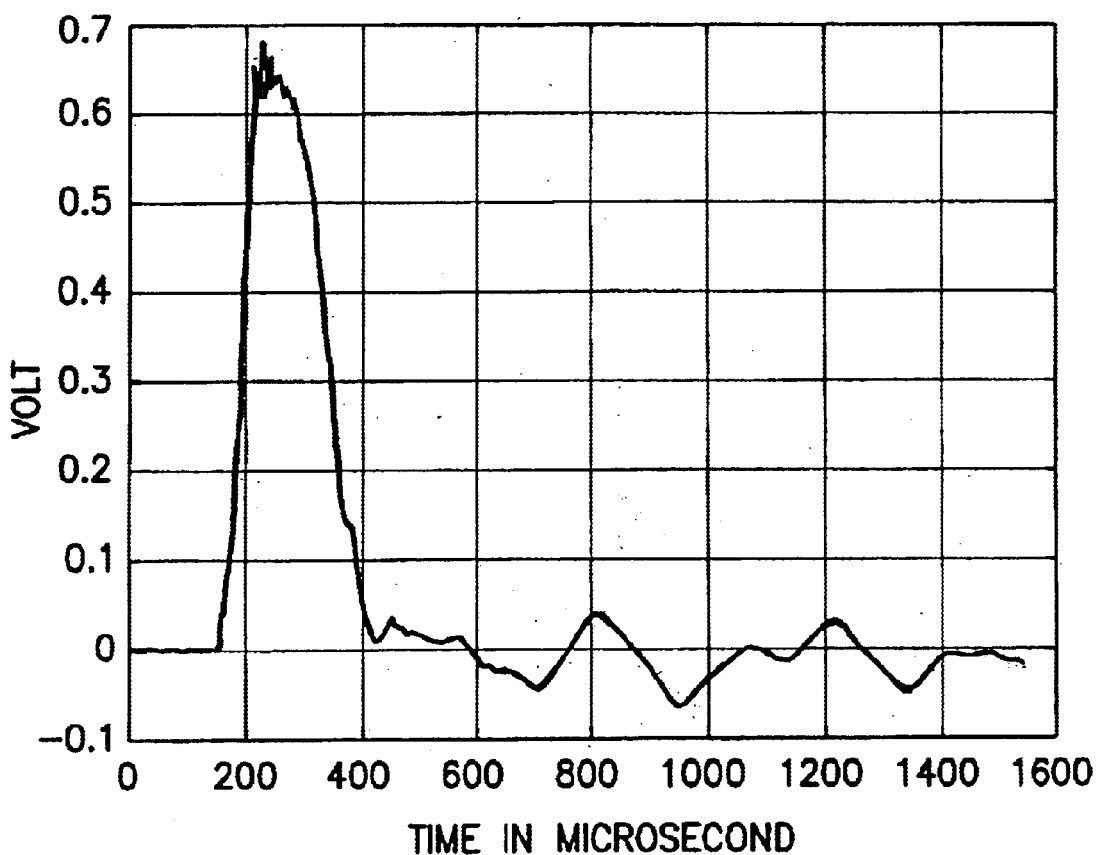
FIG. 4a is a graphical representation of the strain response due to an impact of a three-inch bullet with a PVC head.
Figure 4B:
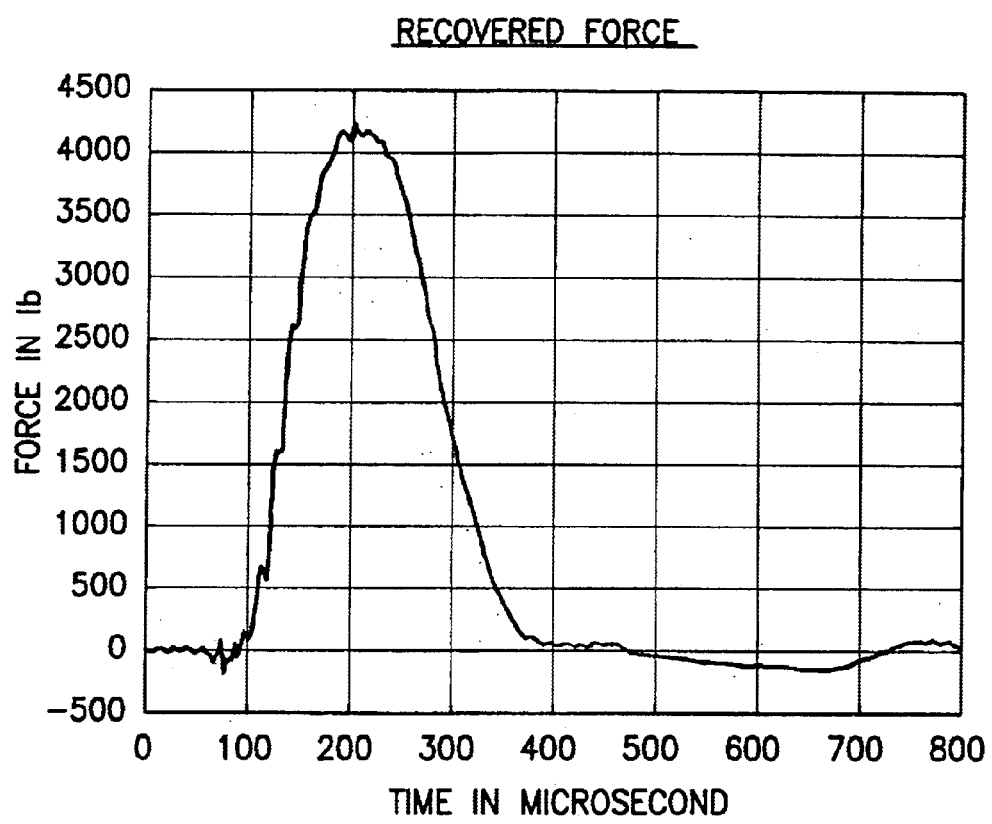
FIG. 4b is a graphical representation of the recovered impact force-time function of a three inch bullet with a PVC head.
Figure 4C:
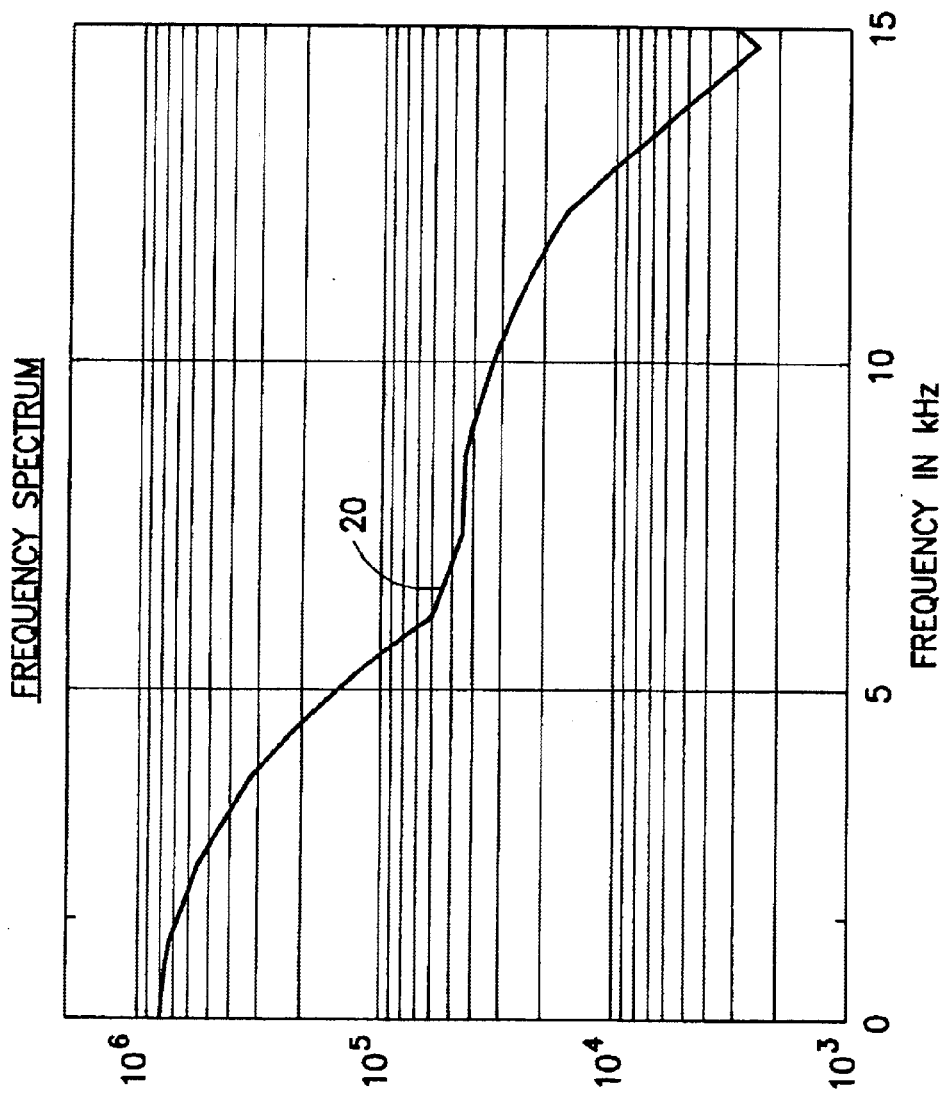
FIG. 4c is a graphical representation of the spectrum of the impact force of FIG. 4b.

FIG. 4a shows the surface sensor response and FIG. 4b shows the recovered force for the bullet with the PVC head. The peak recorded impact force was 4200 pounds with about 300 microseconds contact time. FIG. 4c shows the frequency spectrum of the force-function of FIG. 4b. While the geometry of the fluid-filled borehole acted as a high pass filter to this impact force-function, the spectrum indicates that there was still sufficient low frequency acoustic energy for deep imaging.

The contact time of the impact is closely correlated with the position of the first notch 20 (shown in FIG. 4c), and therefore controls the effective bandwidth of the source. In general, effective bandwidth is inversely proportional to the contact time; that is, the shorter the contact time, the wider the effective bandwidth. FIG. 4b shows that the impact force recorded was not symmetric as predicted by the Hertzian Theory due to the large deformation of the PVC head under a strong impact force.

Figure 5:
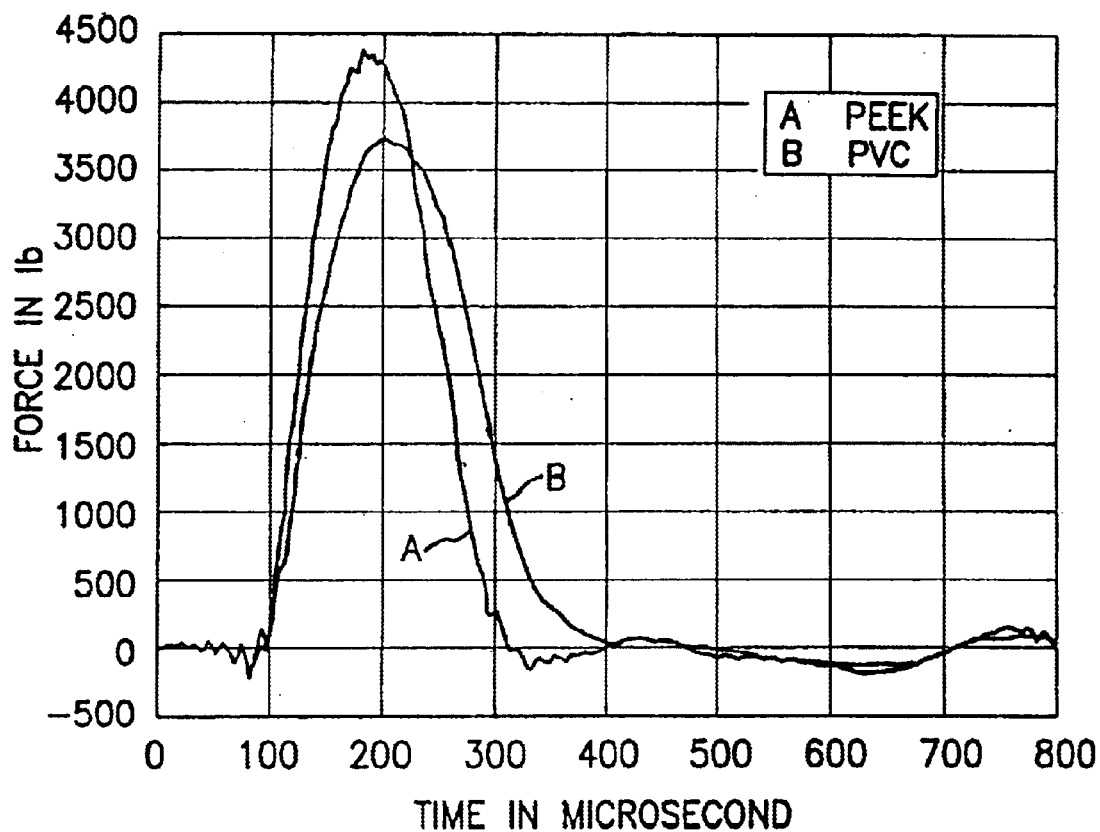
FIG. 5 is a graphical comparison of impact forces of a bullet with a PEEK head and a bullet with a PVC head.

FIG. 5 shows a comparison of the impact force of the bullet capped with the PEEK head A and a bullet capped with a PVC head B. PEEK is a harder material than PVC and, under Hertzian Theory, should produce a larger force with a shorter contact time. Analytical results show that the force-time function was more symmetric for PEEK than PVC, as expected for a harder material. Because the steel capped bullet generated a larger contact force than PEEK, it may damage the formation under test.

Figure 6:
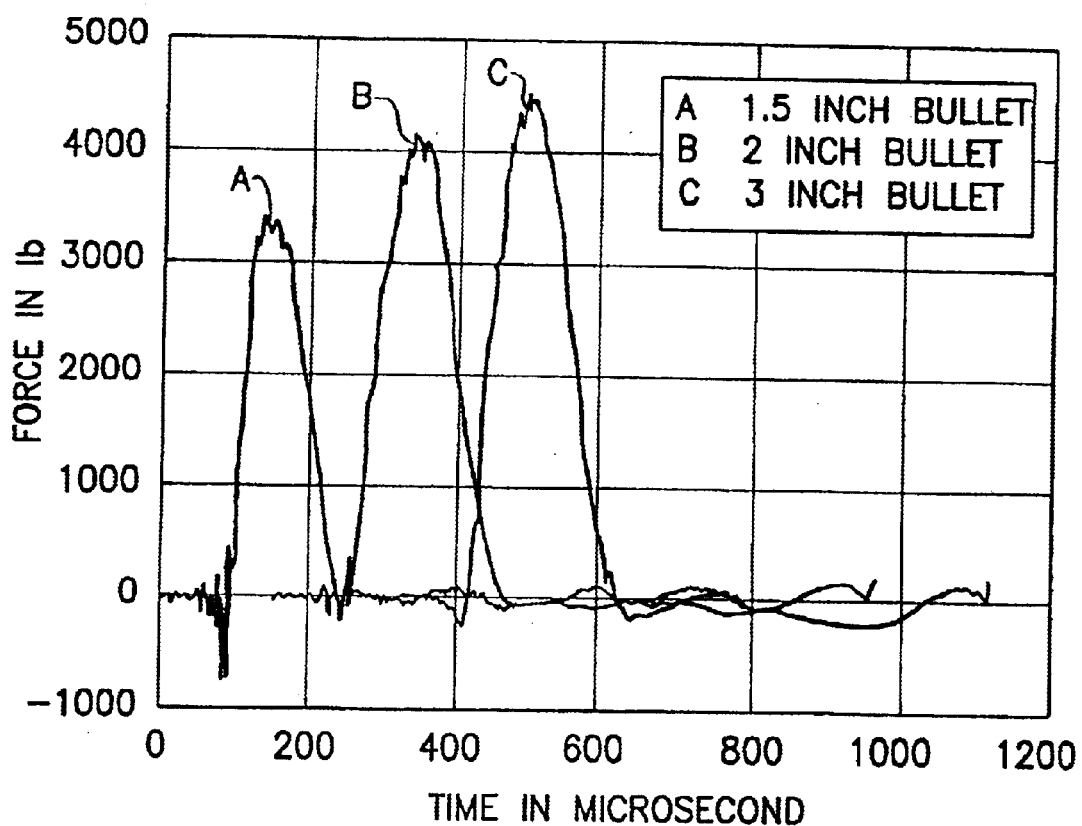
FIG. 6 is a graphical comparison of forces on 1.5-inch, 2-inch and 3-inch bullets with PEEK heads.
Figure 7:
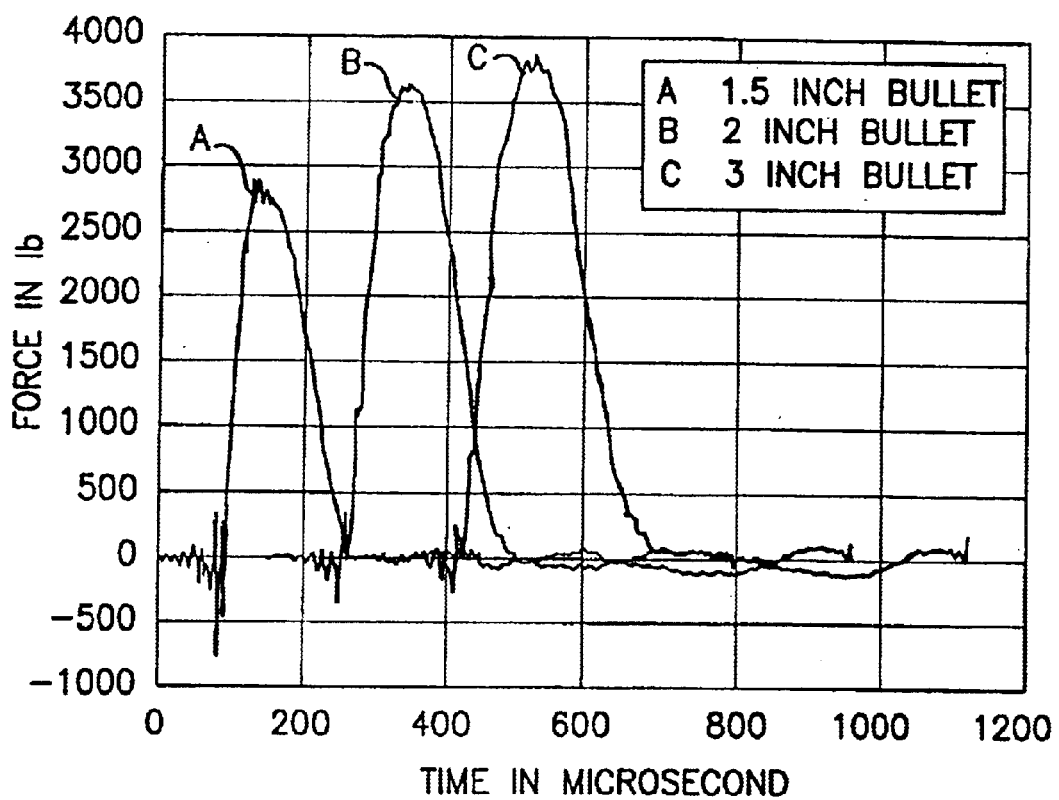
FIG. 7 is a graphical comparison of forces on 1.5-inch, 2-inch and 3-inch bullets with PVC heads.

FIGS. 6 and 7 compare different bullet weights and lengths for PEEK and PVC capped bullets, respectively. In each of these Figures, A represents a 1.5-inch bullet, B represents a 2-inch bullet, and C represents a 3-inch bullet. The time axes have been shifted to ease comparison of these samples. The ringing at the beginning of the recovered force-function corresponding to a shorter contact time was due to the limited bandwidth of the recording system used and should not be interpreted as a ringing of the source.

Irrespective of the material capping the bullet, the observed trend is that the heavier the bullet generates stronger forces and longer contact time in agreement with Hertzian Contact Theory.

The method and apparatus in accordance with the present invention allows acoustic energy to be generated when the bullet 4 is not indirect contact with the borehole apparatus (such as a sonde, drill collar, or permanent installation). Accordingly, in theory, the bullet 4 does not transmit a reaction force to the solenoid 2 or a host tool/borehole apparatus. However, in actuality, the firing of the source (i.e. the acceleration of the bullet 4) will cause a reaction on the solenoid 2 and on any tool in which it was embedded. Even so, using the apparatus and method of the present invention, this reaction is significantly smaller in magnitude relative to the impact forces of conventional acoustic sources.

Figure 8:
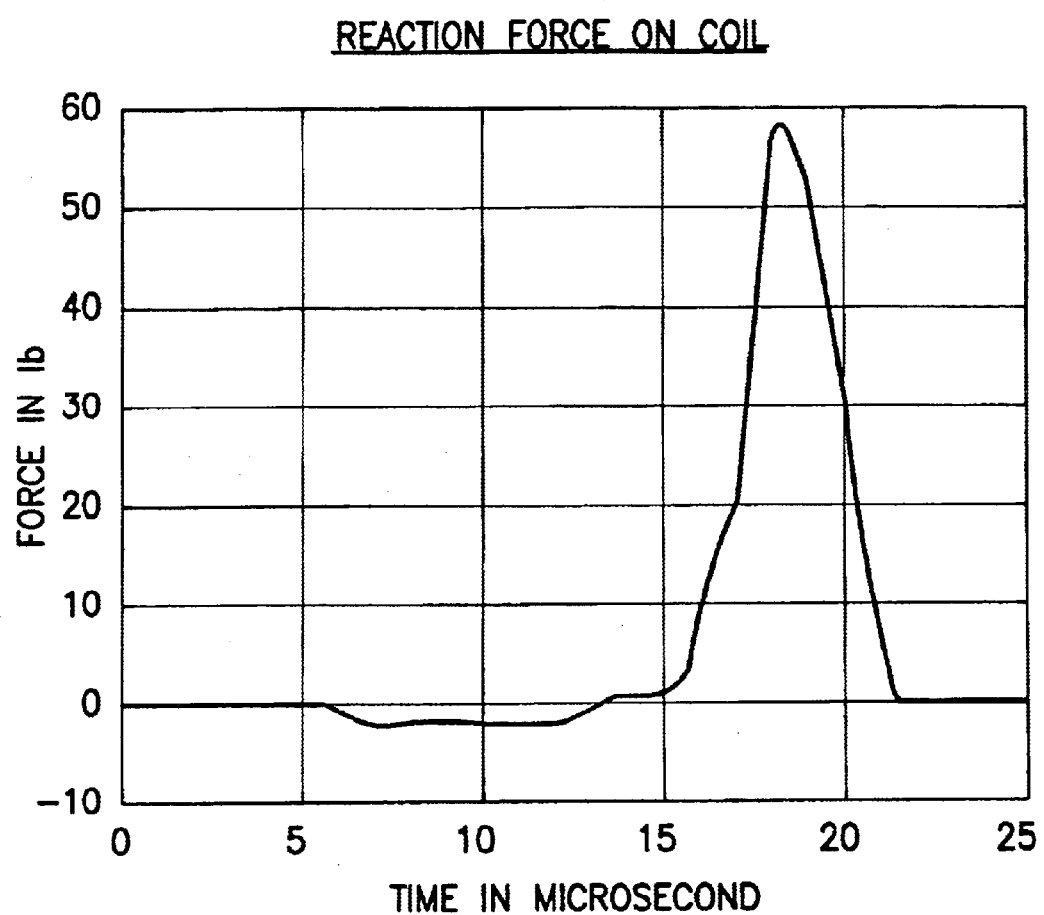
FIG. 8 is a graphical representation of the measured coil reaction force.
Figure 9:
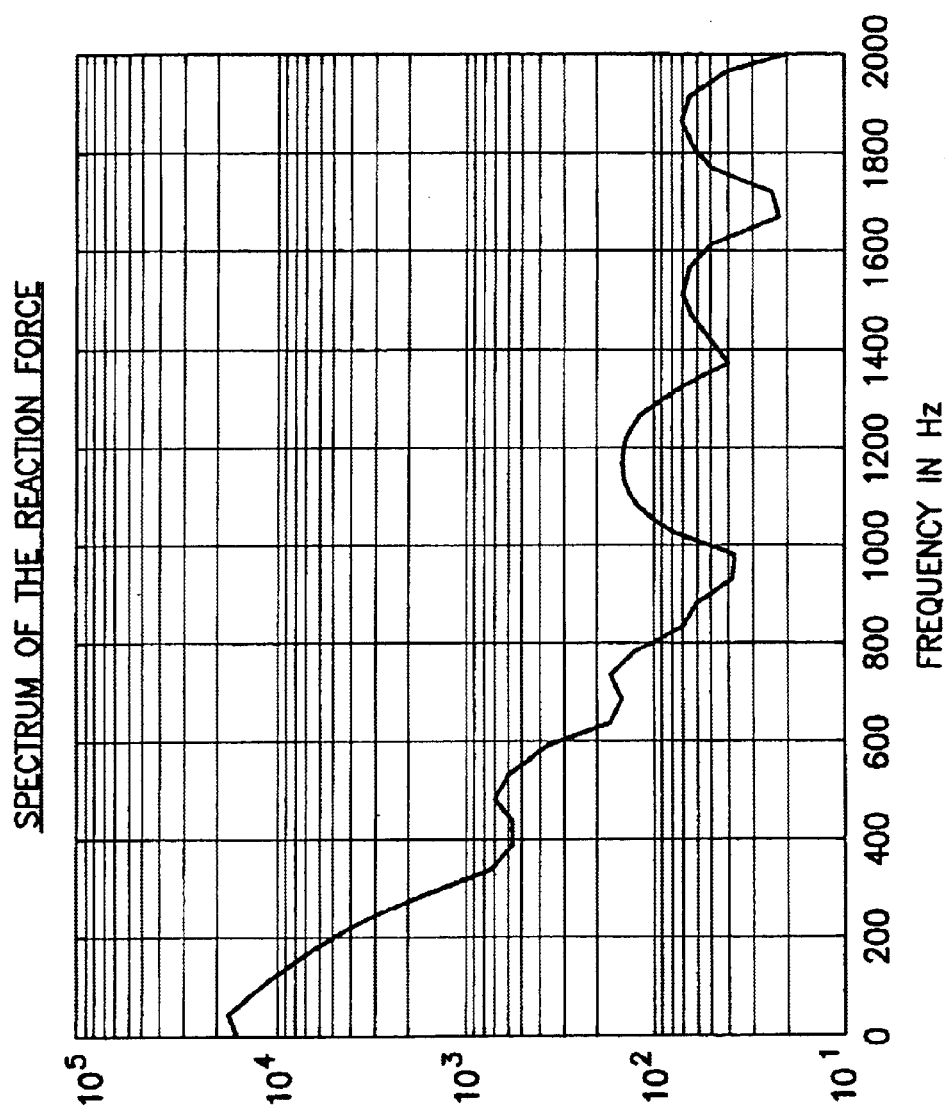
FIG. 9 is a graphical representation of the spectrum of the reaction force shown FIG. 8.

FIG. 8 shows the reaction force recorded on the coil 8 during firing using the apparatus and method of the present invention. The force is approximately two orders of magnitude smaller and dominated at a very low frequency relative to the impact force. Such a lower frequency and amplitude is expected using the configuration of the present invention because the acceleration in the solenoid 2 is much slower than the deceleration at impact. FIG. 9 is the spectrum of the reaction force of FIG. 8.

Analytic expressions may be used to predict acoustic radiation from a fluid-coupled borehole source and from a wall contact source. These expressions were used to determine the efficiency of the present invention for deep sonic imaging. To avoid near field effect, the particle velocity at 50 feet away from the borehole was considered. The far field radiate elastic wave fields can be predicted by the following equation described in cylindrical coordinates:

$$V_r(t) = \frac{F'\left(t - \frac{R}{\alpha}\right)\cos\theta\sin\theta}{4\pi\rho\alpha^2 R} + \frac{aF''\left(t - \frac{R}{\alpha}\right)}{8\pi\rho\alpha\beta^2 R}\left[\frac{T_\alpha^*\left(1 - 2\beta^2\cos^2\left(\frac{\phi}{\alpha^2}\right)\right)}{\left(T_\alpha^* + \frac{\rho_f}{\rho}\right)} + \frac{2\cos 2\theta\sin^2\phi\beta^2}{\left(1 - \frac{\beta^2}{\alpha^2}\right)\alpha^2}\right] \quad (6)$$

$$T_\alpha^* = \frac{\beta^2}{\alpha_f^2}\left(1 - \frac{\alpha_f^2\cos^2\phi}{\alpha^2}\right) \quad (7)$$

Variables for these expressions are shown in the diagram below.

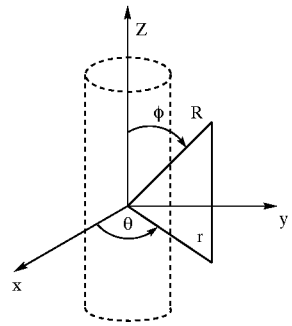

The dominant contribution comes from the first term of equation (6) because in the second term the borehole radius a in the numerator is much smaller than the detecting distance R in the denominator. Under this scenario, the time response of the particle velocity in the formation is a derivative of the impact force.

Figure 10A:
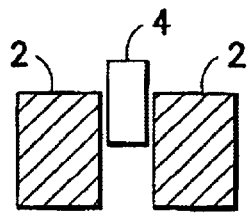
FIGS. 10a–d are schematics of shield configurations.
Figure 10B:
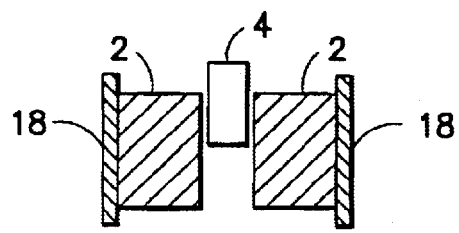
Figure 10C:
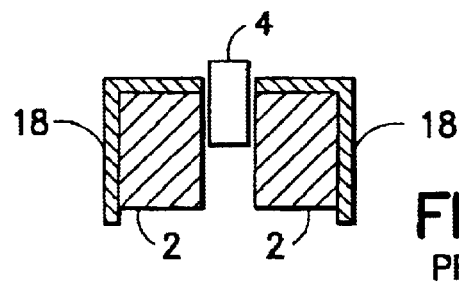
Figure 10D:
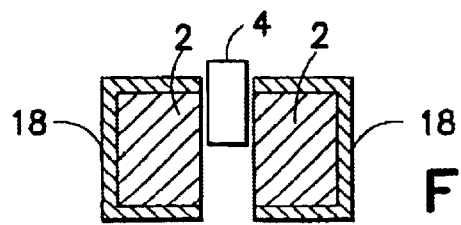

FIGS. 10a–c show that the placement of a magnetic shield 18 around the solenoid 2, preferably around the coil of the solenoid, will enhance the magnetic driving force by as much as four times. FIG. 10a shows one embodiment of the present invention wherein no magnetic shield is used. FIG. 10b shows an alternative embodiment wherein a shield is placed only to the outside of the solenoid resulting in a slight increase in resultant impact force. When the shield of FIG. 10c is used (placed on the outside and on the end of the solenoid opposite the formation) more than twice the impact force is achieved relative to using no shield at all. If a complete shield is used as shown in FIG. 10d almost four times the impact force (relative to using no shield) may be achieved.

The acoustic source of the present invention requires less power as compared to a conventional acoustic logging monopole source. Further, the acoustic radiation strength of the present invention is approximately two orders of magnitude stronger than other piezoelectric borehole sonic sources that are currently commercially available. The forces generated using the method and apparatus of the present invention range between 3000 pounds to 4500 pounds with contact times between 100 and 300 microseconds using bullets with either PEEK or PVC caps. With a steel cap, forces exceeding 5000 pounds can be achieved. Experimental results indicate that this source produces sufficient low frequency energy required for deep imaging.

Figure 11:
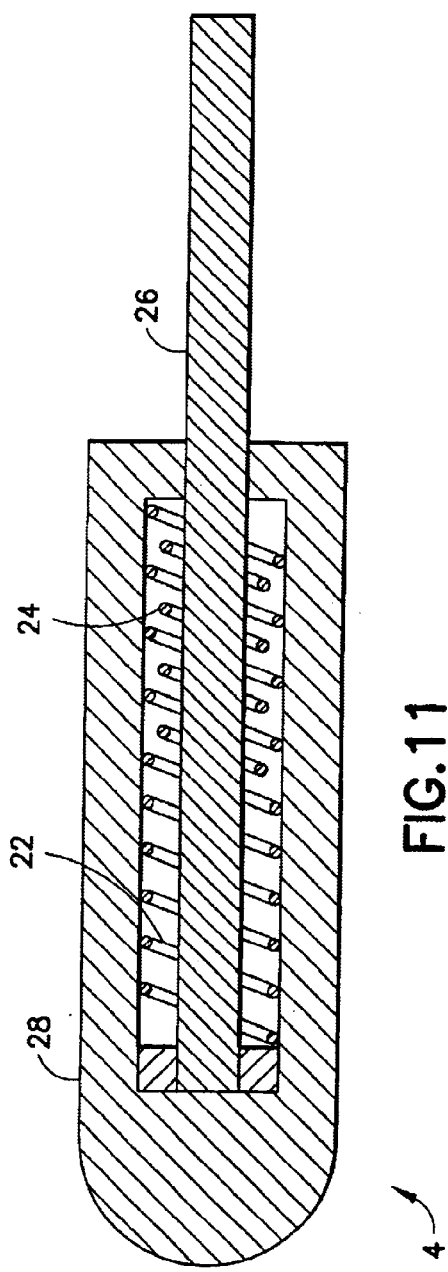
FIG. 11 is a schematic of a preferred retraction means.

To prevent potential loss of the bullet within the formation 12 or the borehole apparatus 30 (shown in FIG. 12), a retraction means may be used to return the bullet 4 into the solenoid 2. FIG. 11 shows an exemplary embodiment of a preferred retraction means. In this embodiment, the bullet 4 may be hollowed with a rod 26 secured to the head 28 of the bullet 4. One or more springs 22 or 24 may be positioned within and affixed to the bullet 4 and the rod 26 such that the spring 22 retracts the bullet 4 into the solenoid 2 (not shown) after impact with the formation 12 (not shown). The rod 26 may be fastened to the solenoid 2 or the borehole apparatus 30.

The disclosed apparatus and method is useful for logging while drilling (LWD), wireline, and permanent monitoring installations applications. For example, the acoustic source may be adapted for use in applications disclosed in commonly owned U.S. Pat. No. 5,036,945 entitled "Sonic Well Tool Transmitter Receiver Array Including an Attenuation and Delay Apparatus", U.S. Pat. No. 5,265,067 entitled "Methods and Apparatus for Simultaneous Compressional Shear and Stoneley Logging", U.S. Pat. No. 5,753,812 entitled "Transducer for Sonic Logging-While-Drilling", and U.S. Pat. No. 5,838,633 entitled "Method for Estimating Formation In-Situ Stress Magnitudes Using a Sonic Borehole Tool", which are incorporated by reference herein in their entireties. These patents are disclosed as non-limiting exemplary applications of the present invention. One skilled in the art would recognize that the present invention may be suitably adapted for additional borehole applications, including monitoring permanent installations and logging open and cased boreholes.

Figure 12:
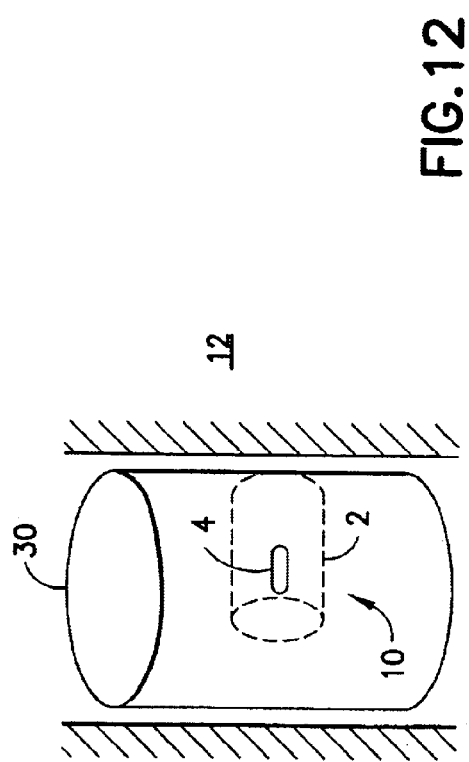
FIG. 12 is a schematic depicting the use of the acoustic source of the present invention in a drill collar, wireline tool or permanent installation.

Turning to FIG. 12, there is shown the acoustic source 10 suitably adapted in a borehole apparatus 30, such as a drilling collar, sonde, or as part of a permanent installation. The acoustic source 10 includes a bullet 4 positioned within the solenoid 2 so that it may create acoustic vibrations on the formation 12.

While the invention has been described herein with reference to certain examples and embodiments, it will be evident that various modifications and changes may be made to the embodiments described above without departing from the scope and spirit of the invention as set forth in the claims.

I claim:

1. An acoustic system for determining properties of a borehole formation comprised of:

a. a borehole apparatus equipped with an acoustic energy source, wherein said acoustic energy source is comprised of a solenoid having a bullet positioned within its coil;

b. driving electronics to control said solenoid to accelerate said bullet and thereby impart acoustic energy into said borehole formation; and c. one or more receivers for receiving said acoustic energy, wherein at least a portion of said acoustic energy has traveled through said borehole formation.

2. The acoustic source of claim 1, wherein said acoustic source further comprises a retraction means to retract said bullet into said solenoid.

3. The acoustic source of claim 1, wherein said borehole apparatus is a sonde, a drill collar, or a permanent installation.

4. The acoustic source of claim 1, wherein said bullet is comprised of a high permeability alloy.

5. The acoustic source of claim 1, wherein said bullet includes a cap.

6. The acoustic source of claim 5, wherein said cap is comprised of material selected from the group consisting of plastic, rubber and metal.

7. The acoustic source of claim 1, further comprising a magnetic shield positioned around said solenoid.

8. A method of sensing properties of a borehole formation, comprising the steps of:

a. providing a borehole apparatus equipped with an acoustic energy source, wherein said acoustic energy source is comprised of a solenoid having a bullet positioned within its coil and wherein said borehole apparatus is further equipped with one or more receivers;

b. applying a current pulse to said solenoid thereby generating a magnetic force to accelerate said bullet;

c. impacting acoustic energy into said borehole formation using said accelerated bullet; and d. receiving said acoustic energy, wherein at least a portion of said acoustic energy has traveled through said formation.

9. The method of claim 8, further comprising the step of switching off the current pulse as said bullet passes through the approximate center of said coil.

10. The method of claim 9, wherein the step of impacting said borehole wall with said bullet occurs when said bullet is not in direct contact with said solenoid.

\* \* \* \* \*